United States Patent
Turpin

(10) Patent No.: US 7,836,627 B2
(45) Date of Patent: Nov. 23, 2010

(54) FOAM COLLAR CHUM DISPENSING SOFT PLASTIC SWIM BAIT ENHANCEMENT ASSEMBLY

(76) Inventor: Corey W. Turpin, 2101 15th St., Apt. 10, Newport Beach, CA (US) 92663

( * ) Notice: Subject to any disclaimer, the term of this patent is extended or adjusted under 35 U.S.C. 154(b) by 115 days.

(21) Appl. No.: 12/110,983

(22) Filed: Apr. 28, 2008

(65) Prior Publication Data
US 2008/0276521 A1 Nov. 13, 2008

Related U.S. Application Data

(60) Provisional application No. 60/928,608, filed on May 10, 2007.

(51) Int. Cl.
*A01K 85/01* (2006.01)
(52) U.S. Cl. .............. 43/42.06; 43/42.24; 43/42.37; 43/42.39
(58) Field of Classification Search .............. 43/42.06, 43/42.24, 42.37, 42.39, 42.26
See application file for complete search history.

(56) References Cited

U.S. PATENT DOCUMENTS

| | | | | |
|---|---|---|---|---|
| 2,596,201 A | * | 5/1952 | Bocchino | 43/42.04 |
| 2,745,206 A | * | 5/1956 | Wilson | 43/42.06 |
| 3,017,716 A | * | 1/1962 | Hawks | 43/42.16 |
| 3,120,074 A | * | 2/1964 | Messler | 43/35 |
| 3,163,958 A | * | 1/1965 | Quinn | 43/42.06 |
| 4,133,134 A | * | 1/1979 | Cheng | 43/42.06 |
| 4,158,927 A | * | 6/1979 | Capra et al. | 43/4.5 |
| 4,856,223 A | * | 8/1989 | Evans | 43/42 |
| 4,890,411 A | * | 1/1990 | Buccilli et al. | 43/42.06 |
| 5,456,039 A | * | 10/1995 | Pisoni et al. | 43/42.24 |
| 6,298,595 B1 | * | 10/2001 | Friedlob | 43/42.06 |
| 2003/0046857 A1 | * | 3/2003 | Paulsen et al. | 43/42.06 |
| 2007/0144054 A1 | * | 6/2007 | Warczok et al. | 43/42.06 |

* cited by examiner

*Primary Examiner*—Kimberly S Smith
*Assistant Examiner*—Marisa Conlon
(74) *Attorney, Agent, or Firm*—Walter A. Hackler

(57) ABSTRACT

Fishing lure apparatus includes a weighted head, a body portion fixable to the head and a foam annulus disposed between the body portion and the head. The foam annulus has a dimension greater than a dimension of the head for enabling expansion thereof upon water impingement thereagainst during movement through a body of water. Expansion of the annulus is dependent upon the velocity of the head through the water body. The foam annulus is formed from a material capable of absorbing and temporarily retaining attractant and the attractant is displaceable by water in order to simultaneous disperse the fix attractant as the head is drawn through the water body.

8 Claims, 2 Drawing Sheets

FOAM COLLAR CHUM DISPENSING SOFT PLASTIC SWIM BAIT ENHANCEMENT ASSEMBLY

This application claims priority from U.S. Ser. No. 60/928,608 filed May 10, 2007 and this referenced patent application is to be incorporated herewith in its entirety.

The present invention generally relates to sport fishing and is more particularly directed to fishing lure apparatus for providing controlled release of a fish attractant.

In sport fishing, the use of artificial lures is quite developed with such lures being of a great variety of shapes, sizes, and materials.

Sport fishermen spend a great deal of concentration and time in order to provide the proper lure for the right fishing environment.

The weight of the lure provides an important consideration in the ability to cast the lure in both fresh and saltwater sport fishing. The shape of the lure also contributes to the descent of the lure in a body of water after casting. The casting range and the set speed are additional considerations taken into account by serious sport fishermen.

In addition to the lure design, fish attractants have been developed for application to the artificial lures. Such fish attractants are designed to emit a scent and/or have a taste that is attractive to fish in complementing the designed action of a lure in order to cause the fish to strike the lure.

Fish attractants are available in many forms such as liquid, such as applied often through spray bottles or rubbed on the lure. An attractant is applied in this manner attends to dissipate in the water rapidly as the lure is retrieved and accordingly do not last the entire travel of the lure through the water.

Other fish attractants come in the form of gels or pastes, which are usually applied directly onto the lure and again are released into the water as the lure is retrieved for the fisherman.

Accordingly, there remains a need for a new and improved fishing lure apparatus which provides a controlled release of fish attractant throughout the course of retrieval subsequent to casting of the lure. The present invention not only fills that need but in addition enables a lure to be cast at a farther distance and provides for a slower descent of the lure in a body of water.

SUMMARY OF THE INVENTION

Fishing lure apparatus in accordance with the present invention generally includes a foam annulus disposable between a swim bait tail and a jig head with a foam annulus having a dimension greater than a dimension of the head, thus, enabling expansion of the annulus upon water impingement thereagain. The water impingement is effected by the head, which is smaller than the annulus, thereby causing a current of water thereagainst upon movement of the head through a body of water, to impinge the annulus subsequent to such movement being caused by a fisherman retrieving the lure apparatus following casting. Exposure of the annulus may be enhanced by a cupped forward portion.

With this configuration, expansion of the annulus is dependent upon the velocity of the foam annulus through the water body. The velocity is determined by the rate of retrieval established by the fisherman. In this manner, more fish attractant is released by the foam during rapid movement and less fish attractant is released upon slower movement.

Accordingly, controlled released is established by the lure apparatus in accordance with the present invention. This configuration not only enables the fish attractant to be dispersed in the water along the entire path of the lure apparatus retrieval, but also enables extended use of the lure apparatus by way of multiple castings, particularly when a slow retrieval is brought about by the fisherman.

The foam annulus is formed from a material capable of absorbing and temporarily retaining fish attractant and, as hereinabove noted, the fish attractant is displaceable by the water in order to simultaneously disperse the fish attractant as the lure apparatus is drawn through the water body.

The present invention further includes in combination, a weighted head, along with a body portion affixed to the head with the foam annulus disposed between the body portion and the head.

The foam annulus, disposable between the swim bait tale and the jig, head is also effective for increasing the buoyancy of the combination of the bait tail, foam annulus, and jig head in order to decrease the descent time, of the combination, in the body of water. Further, the weight of the foam annulus in combination with the bait tail and jig head facilitates and enables farther casting of the combination.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
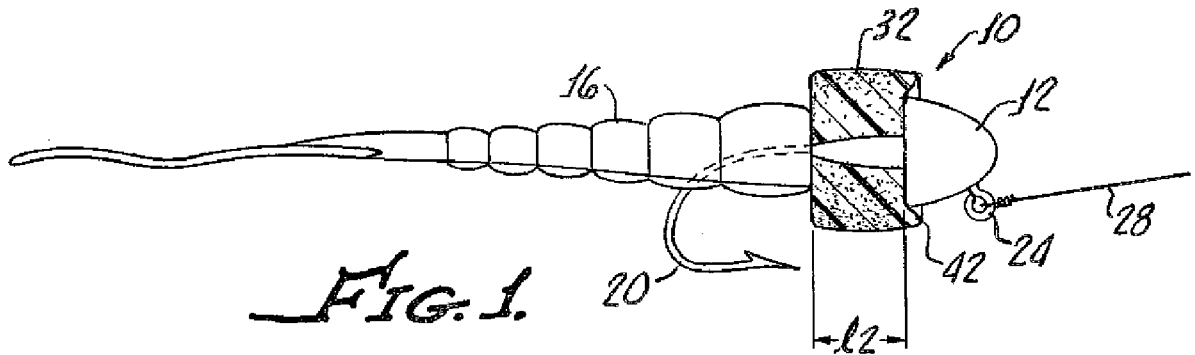
FIG. 1 is a side view of one embodiment in accordance with the present invention generally showing a weighted jig head, a body portion, or bait tail, along with a foam annulus disposed between the body portion and the head.

With reference to FIG. 1, there is shown fishing lure apparatus 10 in accordance with the present invention which generally includes a weighted jig head 12, and a bait tail, or body portion, 16 of any desired design.

A hook 20 preferably extends from the head 12 and extends through the body portion 16. An eyelet 24 affixed to the head 12 enables casting and retrieval of the lure apparatus 10 via a fishing line 28 in a conventional manner.

Figure 2:
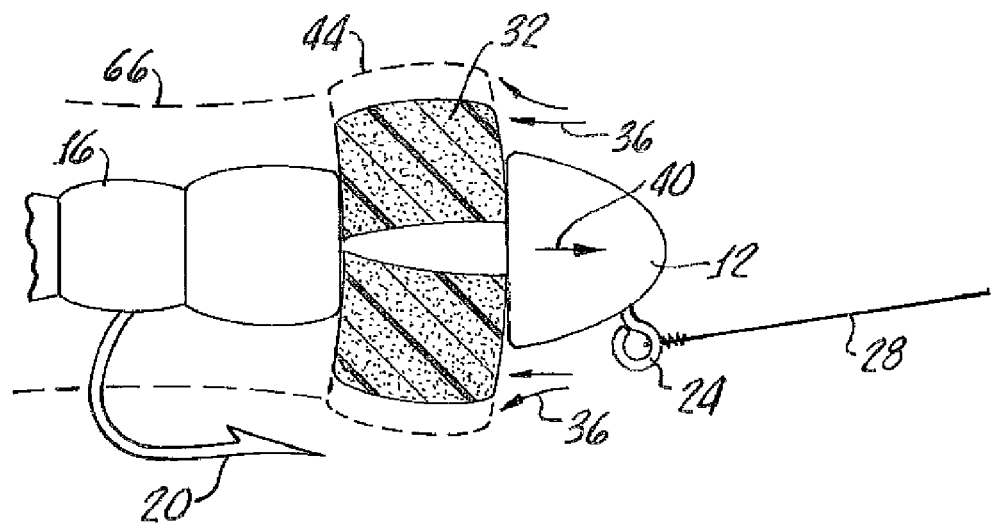
FIG. 2 is an illustration similar to FIG. 1 showing the action of the foam annulus during movement of the lure apparatus and head through a body of water showing expansion of the annulus upon water impingement thereagainst and the simultaneous dispersement, or release, of fish attractant within the annulus into the body of water. The thickness of the annulus enabling resistance resulting in radial expansion of the annulus which is dependent upon velocity of the head through the water body.

Disposed between the head 12 and body portion 16 is a foam annulus 32 having a dimension greater than a dimension of the head 12 which enables expansion thereof upon water impingement shown by the arrows 36 shown in FIG. 2 illustrating movement of the lure apparatus 10 in a direction indicated by arrow 40 when retrieved or pulled through the water by a fisherman, not shown. A cupped forward portion 42 may be formed into the annulus 32 to enhance the capture of water as the lure 10 is drawn through water which concomitantly enhances the expansion of the annulus 32. Alternatively, the cupped portion 42 may be formed by pushing the body portion 16 toward the head 12 with the annulus 32 squeezed therebetween.

Figure 2A:
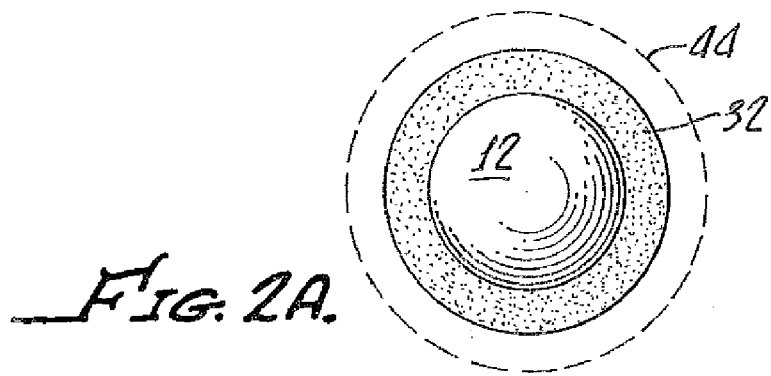
FIG. 2A is a front view of the embodiment shown in FIGS. 1 and 2 illustrating expansion of the foam annulus.

The impingement of water causes expansion of the foam annulus 32 in a radial direction as illustrated by a dotted line 44 with expansion being a function of the velocity of retrieval, see also FIG. 2A.

The foam annulus may be formed from any suitable open cell polyether, polyester, or polyurethane foam, or open cell sponge rubber foam, or open cell latex form. Such materials are capable of absorbing and temporarily retaining fish attractant, and, as shown in FIG. 2, such attractant is displaceable by water in order to simultaneously disperse the fish attracting as the lure apparatus 10 and head 12 are drawn through a water body (not shown). The attractant may be any suitable liquid or gel scent.

Figure 3:
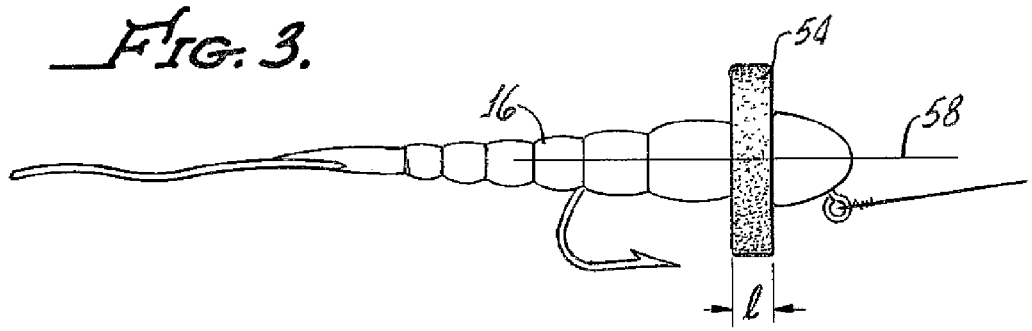
FIG. 3 is a side view of another embodiment of the present invention illustration the foam annulus of thinner dimension.
Figure 4:
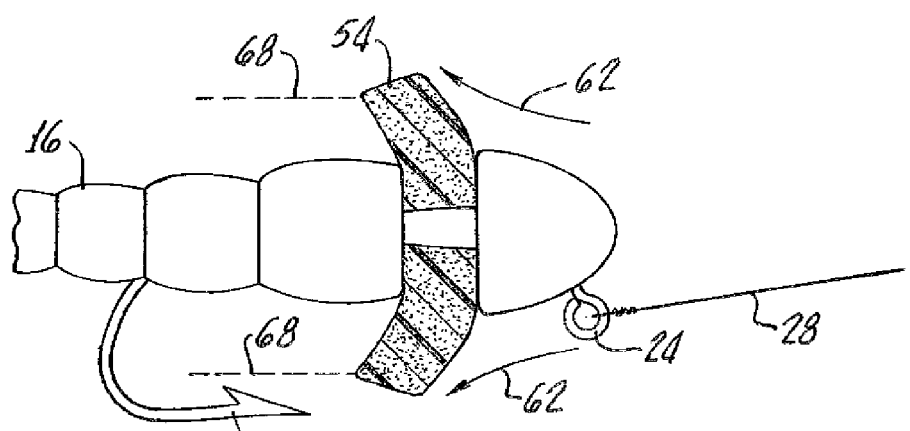
FIG. 4 illustrates the action of the annulus upon movement through the water illustrating linear expansion of the annulus along the length or centerline of the bait tail, or body portion.

FIG. 3 illustrates another embodiment lure apparatus 50 with identical or substantially similar elements identified by common character references realized in FIGS. 1 and 2. In this embodiment, the annulus 54 has a length 1 measured along a body portion centerline 58 which is significantly less than a length $l_2$ subject of the annulus 32 illustrated in FIG. 1. This enables linear expansion of the annulus as illustrated in FIG. 4 by the impingement of water indicated by the arrows 62. Release of attractant is illustrated as a dotted lines 66 in FIGS. 2 and 4 respectively.

The difference in annulus size also determines the weight of the combination head 12, annulus 32, 54, and 16 which, in turn, not only enables different casting distances, but also controls descent of the lure apparatus 10, 50 in the body of water.

Figure 4A:
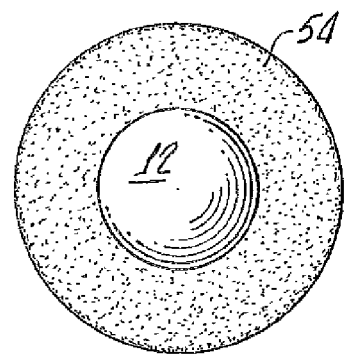
FIG. 4A is a front view of the embodiment shown in FIG. 4.
Figure 5:
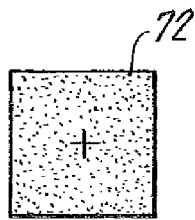
FIGS. 5, 6, and 7 illustrate various annulus shapes suitable for use in the present invention.
Figure 6:
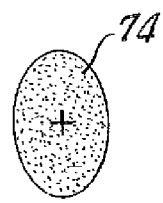
Figure 7:
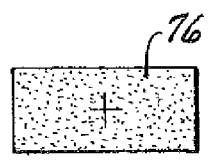

While the annulus 44, 54 are illustrated as being circular in perimeter in FIGS. 2a and 4a, other perimeters may be utilized in accordance with the present invention as shown by the annuli 72, 74, 76 shown in FIGS. 5, 6, and 7 which illustrate the square and rectangular perimeters.

Although there has been hereinabove described a specific foam collar chum dispensing soft plastic swim bait enhancement assembly in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. Fishing lure apparatus comprising:
 a weighted head;
 a body portion fixable to the head; and
 a foam annulus disposed between said body portion and the head, said foam annulus having a diameter greater than a maximum diameter of the head and transversely expandable upon water impregnated therein, directed by the head, upon movement through a body of water, expansion of the annulus being dependent upon velocity of the head through the water body, said foam annulus being formed from a material capable of absorbing and temporarily retaining fish attractant, said fish attractant being displaceable by water in order to simultaneously disperse the fish attractant as the head is drawn through the water body, said foam annulus including a cupped portion in which a base portion of the head resides, said foam annulus extending over the head for capture of water passing over the head as the head is drawn through the water body, the capture of water transversely expanding said foam annulus.

2. The lure apparatus according to claim 1 further comprises a fishhook attached to the head and extending through said body portion.

3. The lure apparatus according to claim 1 wherein said foam annulus has a circular perimeter and said weighted head has the maximum diameter abutting said from annulus under said cupped portion and a minimum diameter distal from said foam annulus.

4. The lure apparatus according to claim 1 wherein said foam annulus has a length, measured along said body portion, enabling radial expansion as a function of velocity.

5. Fishing lure apparatus comprising:
 a foam annulus disposable between a swim bait tail and a jig head, said foam annulus having a diameter greater than a maximum diameter of the head and transversely expandable upon water impregnated therein, directed by the head, upon movement through a body of water, transverse expansion of the annulus being dependent upon velocity of the said foam annulus through the water body, said foam annulus being formed from a material capable of absorbing and temporarily retaining fish attractant, said fish attractant being displaceable by water in order to simultaneously disperse the fish attractant as the head is drawn through the water body, said foam annulus includes a cupped portion in which a base portion of the head resides, said foam annulus extending over the head for capture of water passing over the head as the head is drawn through the water body, the capture of water transversely expanding said foam annulus.

6. The lure apparatus according to claim 5 further comprises a fishhook attached to the head and extending through said swim bait tail.

7. The lure apparatus according to claim 5 wherein said foam annulus has a circular perimeter and said jig head has the maximum diameter abutting said foam annulus under said cupped portion and a minimum diameter distal from said foam annulus.

8. The lure apparatus according to claim 5 wherein said foam annulus has a length, measured along said swim bait tail, enabling radial expansion of said foam annulus as a function of velocity.

* * * * *